United States Patent
Takamatsu et al.

[15] 3,660,052
[45] May 2, 1972

[54] COMPOUND BODIES OF ALUMINIUM PLATED STEEL STOCKS

[72] Inventors: Hideaki Takamatsu, Kodaira-shi; Akira Miyata, Kawasaki-shi; Yutaka Toyabe, Tokyo, all of Japan

[73] Assignee: Nippon Kokan Kabushiki Kaisha, by said Akira Miyata

[22] Filed: June 3, 1969

[21] Appl. No.: 829,917

[52] U.S. Cl. ............... 29/195, 29/196.2, 161/89, 161/92, 161/216, 161/221, 260/739
[51] Int. Cl. ............... B32p 3/20, B32b 5/02, B32b 15/06
[58] Field of Search ............... 29/196.2, 195 E, 195 F; 161/92, 89, 88, 216, 221; 260/921, 739

[56] References Cited
UNITED STATES PATENTS

| | | | |
|---|---|---|---|
| 3,382,136 | 5/1968 | Bugel et al. | 161/216 X |
| 3,305,384 | 2/1967 | Kenderi | 29/196.2 X |
| 3,305,323 | 2/1967 | Smith et al. | 29/196.2 X |
| 3,057,050 | 10/1962 | Hodge et al. | 29/196.2 |
| 2,511,581 | 6/1950 | Grigsby | 161/221 X |
| 260,020 | 6/1882 | Greacen | 161/221 X |

Primary Examiner—Robert F. Burnett
Assistant Examiner—Mark A. Litman
Attorney—Flynn & Frishauf

[57] ABSTRACT

Steel stocks in the form of the wire, plate, rod, tube, etc., having thin aluminium plated films are bonded to rubber or synthetic resin having durable bonding and good mechanical properties. Aluminium films prevent diffusion of deleterious elements in rubber into steel.

6 Claims, 1 Drawing Figure

PATENTED MAY 2 1972
3,660,052
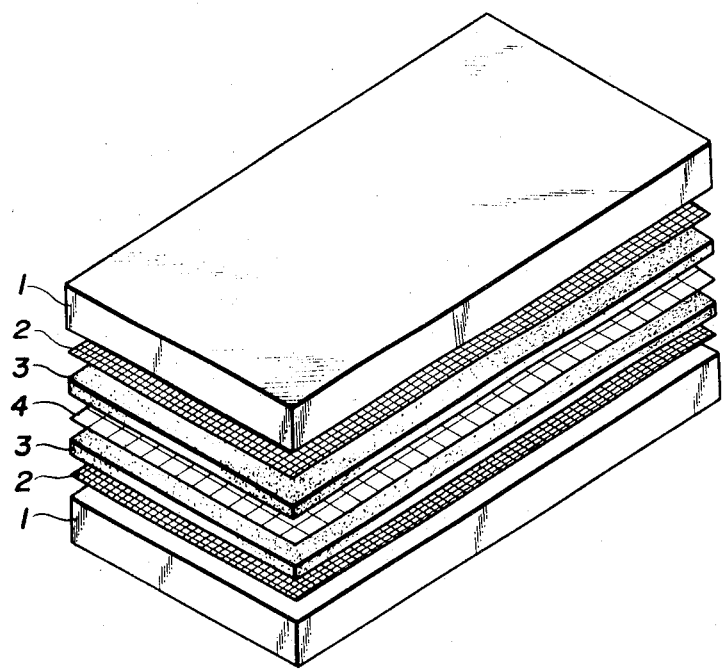

COMPOUND BODIES OF ALUMINIUM PLATED STEEL STOCKS

BACKGROUND OF THE INVENTION

This invention relates to a compound body of an aluminum plated steel stock.

Rubber belts or motor car tires and the like now being widely used generally include cotton threads, nylon cords or canvasses or the like which are utilized to enhance the property of rubber and to reinforce the products. Presently, to further increase the mechanical strength of the products, steel wires are also used in lieu of or together with above described reinforcing materials. In such a case, brass plated steel wires have been utilized to protect the steel against deleterious effects caused by the composition rubber; for example, effect of sulfur upon steel and effect of nascent hydrogen due to hydrocarbon or to increased bonding strength. Use of such brass plated steel wires is not always satisfactory because the bonding strength gradually decreases as time elapses (or progress of reaction between sulfur and copper of base composition) and because it is difficult to obtain uniform plated layers of the alloy.

SUMMARY OF THE INVENTION

It is therefore an object of this invention to provide a novel compound body containing an aluminum plated steel stock manifesting constant and excellent bonding strength over a very long period.

It is to be understood that the term "steel stock" utilized in the specification and claims includes any and all steel products such as steel wires, steel sheets or plates, steel rods, steel pipes, steel wire nets, and the like. Aluminum may be coated or deposited by any technique, and characterized by its extremely thin thickness. Further, the term "compound body" includes not only a compound body consisting of said aluminum plated steel stock and any one of various rubber or synthetic resins but also a plurality of compound aluminum plated steel stocks. Relatively thick plated aluminum layers can also be used so long as they do not have a tendency to peel off due to the presence of alloy layers and the like. Preferred plated aluminum layers are dense aluminum films which are produced by electrolysis in a fused salt. It was found that such films can completely prevent penetration or diffusion of deleterious ingredients of the rubber composition into steel. (The deleterious effect of sulfur upon low alloy high tensile strength steel stocks which are now widely used is well recognized in the art.) Furthermore, as the bonding strength between rubber and aluminum is much higher than that between steel and rubber, it is possible to manufacture many types of compound bodies which utilize steel stocks as the reinforcing member. Instead of the fused salt electroplating technique, any aluminum coating method that does not affect steel stocks and can form strong bond therewith can be used in this invention, such as vapor deposition, cladding and dipping. But from standpoint of economy and strength thin films produced by the fused salt method are preferred.

BRIEF DESCRIPTION OF THE DRAWING

Further objects and advantages of the present invention will become apparent and this invention will better be understood from the following description, reference being made to the accompanying drawing. The features of novelty which characterize the invention are set forth in the claims annexed to and forming part of this specification. The single FIGURE of the accompanying drawing shows an exploded perspective view of one embodiment of this invention.

DESCRIPTION OF THE PREFERRED EMBODIMENT

The following specific examples are given by way of illustration, and are not to be construed as limiting in any way the scope and spirit of the invention.

EXAMPLE 1

A steel wire, 10 meters long and 0.3 mm in diameter was loosely wrapped around a steel frame, degreased with acetone, washed with 5% hydrochloric acid to remove surface rust and contaminants and then dipped in a fused salt aluminum plating bath consisting of 75% of $ALCL_3$, 15% of NaCl and 10% of KCL. A voltage of 1.0 V and a current of 2 amperes were used to form a plated layer of 3 microns thick on the steel wire. The coated steel wire was then rinsed in water by utilizing ultrasonic waves and dried in hot air. A compound prepared by mixing 240 parts of coprecipitated barium silicate and rubber, 5 parts of sulfur, 5 parts of zinc white and 2 parts of a reaction accelerator was coated to a thickness of about 1 mm on the surface of a layer of rubbery composition which forms the lowermost layer of the compound body and said aluminum plated steel wires were laid on said mixtures at a spacing of 5 mm. On these steel wires were laminated the above described mixture and layer of rubbery composition. The laminated assembly was then placed in a moulding machine in which it was pressed and heated to 150°C for 20 minutes and was then cooled in air. The compound article thus obtained was pliable, very strong and had far higher stiffness than compound bodies containing cotton threads.

EXAMPLE 2

A cotton net was placed on the lowermost layer of a rubber composition, a layer of the mixture containing coprecipitated barium silicate and rubber and other assistants pointed out in Example 1 was placed on the cotton net and elongated aluminum plated steel sheets respectively having a thickness of 0.3 mm, a width of 4 mm and a thickness of aluminum plating of 1 micron were laid on the mixture at a spacing of 5 mm. Then, on the steel sheets, the mixture, cotton net and rubber composition were successively laminated. The laminated assembly was then pressed, heated to 170°C for 20 minutes and cooled in air. Shock and vibration test over a long time proved that the compound body does not peel off.

EXAMPLE 3

A cotton net was placed on the lowermost layer of rubber composition, a layer of the same mixture as that of Example 1 containing coprecipitated barium silicate and rubber and other assistants was applied on the cotton net and a wire net comprising steel wires of 0.5 mm in diameter and plated with aluminum of 5 micron thickness was applied on the layer of said mixture. A layer of said mixture, a cotton net and a layer of rubber composition were successively laminated on the steel wire net and the assembly was pressed, heated to 180°C for 25 minutes and cooled in air. The bonding strength between rubber layers and metal surface was extremely high and these layers did not peel off until rupture of the rubber composition. Referring now to the accompanying drawing which shows an exploded perspective view of various elements of a novel compound body, reference numeral 1 represents a layer of rubber composition, 2 a cotton net, 3 a layer of bonding composition or mixture described and 4 a wire net of aluminum plated wires.

While the above embodiments were illustrated in terms of compound bodies comprising rubber belts reinforced by aluminum plated steel stocks, motor car tires, pressure tight flexible rubber pipes or tanks respectively reinforced by embedded aluminum plated steel wires can equally be produced. Many other aluminum plated steel plates—rubber or resin compound articles can also be produced including doors for use in buildings wherein rubber compounds are totally enclosed by aluminum plated steel plates, vibration absorption members, members in which synthetic resin is sealed in housings of aluminum plated steel plates and the mechanical load is borne by steel plates, various panels, boards and the like. As synthetic resin to be encapsulated may be mentioned polyolefin and polyethylene for applications where the load is relatively small and the article is subjected to temperatures of less than 50°C, polypropylene for applications where the load is not so high and the article is subjected to temperature up to 100°C and an unsaturated polyester for applications where temperatures exceed 100°C. For normal temperature uses artificial and synthetic resins may be used.

As above described, since in accordance with this invention, with extremely thin plated aluminum films it is possible to provide a strong bonding force and to prevent diffusion of deleterious contaminants into steel: thus, it is possible to decrease the quantity of expensive aluminum used, and to reduce the cost of manufacturing. Although in the above examples the thickness of aluminum was shown as 3 microns it should be understood that there is no upper limit for that thickness so long as the plated film can be strongly bonded to the substructure. With regard to the lower limit we have found that a thickness of the plated aluminum film as low as 0.05 micron can be used satisfactorily.

Powerful bonding agents for bonding rubber to metal and metal to metal have been recently developed. Thus, it is of course possible to bond steel plate to steel plate but unless subjected to a suitable surface treatment, bonded surfaces between steel plates gradually exhibit stress corrosion, thus peeling off finally. Such difficulty can also be eliminated by this invention by utilizing the aluminum plated steel plates together with the bonding agent as illustrated in the embodiments, maleic imide as well as various bonding rubber or synthetic resin to metal.

Thus, in accordance with this invention, by merely providing thin aluminum coatings on steel stocks which heretofore have been difficult to bond directly to rubber, resin and the like, it is possible to provide various compound bodies of good appearance and having persistent strong bonding.

What is claimed is:

1. A compound body comprising aluminum plated steel stock wherein at least one aluminum plated steel member and at least one layer of rubbery composition bonded together by means of a bonding agent comprising coprecipitated barium silicate and rubber, said rubber being bonded to the aluminum of said aluminum plated steel.

2. A compound body of claim 1, wherein the thickness of the aluminum is up to about 3 microns.

3. A compound body of claim 1, wherein said steel stock is an aluminum plated steel wire.

4. A compound body of claim 1, wherein said steel stock comprises an aluminum plated steel wire net.

5. A compound body of claim 1, wherein a layer of organic textile fiber is interposed between said aluminum plated steel stock and said rubber and is bonded thereto by a bonding agent.

6. A compound body of claim 1, wherein said steel stock is an aluminum plated steel plate.

* * * * *